(12) United States Patent
Colotte et al.

(10) Patent No.: US 11,460,334 B2
(45) Date of Patent: Oct. 4, 2022

(54) DEVICE AND METHOD FOR CHECKING FILL LEVEL OF A CARTRIDGE

(71) Applicant: Altria Client Services LLC, Richmond, VA (US)

(72) Inventors: Guillaume Colotte, Arnex sur Orbe (CH); Stephane Bilat, Areuse (CH)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 17/130,063

(22) Filed: Dec. 22, 2020

(65) Prior Publication Data

US 2021/0108956 A1 Apr. 15, 2021

Related U.S. Application Data

(63) Continuation of application No. 15/946,998, filed on Apr. 6, 2018, now Pat. No. 10,876,879, which is a (Continued)

(30) Foreign Application Priority Data

Apr. 7, 2017 (EP) ..................................... 17165579

(51) Int. Cl.
*G01F 23/18* (2006.01)
*A24F 40/51* (2020.01)
(Continued)

(52) U.S. Cl.
CPC .............. *G01F 23/18* (2013.01); *A24F 40/51* (2020.01); *A24F 40/53* (2020.01); *A24F 40/10* (2020.01)

(58) Field of Classification Search
CPC combination set(s) only.
See application file for complete search history.

(56) References Cited

U.S. PATENT DOCUMENTS

| 4,869,104 A | 9/1989 | Saito et al. |
| 2006/0127281 A1 | 6/2006 | Bjornson et al. |

(Continued)

FOREIGN PATENT DOCUMENTS

| CN | 203873007 U | 10/2014 |
| GB | 2512329 A | 10/2014 |

(Continued)

OTHER PUBLICATIONS

Extended European Search Report #17165579 dated Oct. 26, 2017.

*Primary Examiner* — Paul M. West
*Assistant Examiner* — Mark A Shabman
(74) *Attorney, Agent, or Firm* — Harness, Dickey & Pierce, P.L.C.

(57) ABSTRACT

A aerosol-generating system includes a liquid storage portion, a liquid pressure sensor within the liquid storage portion, and a control unit that is in communication with the pressure sensor. The aerosol-generating system further includes an atmospheric pressure sensor in communication with the control unit. The atmospheric pressure sensor is configured to sense the atmospheric pressure of the environment. The control unit is configured to receive the pressure signals from the liquid pressure sensor and the atmospheric pressure sensor. The control unit is further configured to determine the fill level of the liquid aerosol-forming substrate based on a comparison of the pressure signals from the liquid pressure sensor and the atmospheric pressure sensor.

19 Claims, 3 Drawing Sheets

Related U.S. Application Data continuation of application No. PCT/EP2018/057334, filed on Mar. 22, 2018.

(51) Int. Cl.
  *A24F 40/10* (2020.01)
  *A24F 40/53* (2020.01)

(56) References Cited

U.S. PATENT DOCUMENTS

| | | |
|---|---|---|
| 2012/0325022 A1 | 12/2012 | Shanebrook et al. |
| 2013/0327787 A1 | 12/2013 | Koltay et al. |
| 2014/0150810 A1* | 6/2014 | Hon ............... A24F 47/008 131/329 |
| 2014/0270727 A1 | 9/2014 | Ampolini et al. |
| 2016/0158782 A1* | 6/2016 | Henry, Jr. ............... B05B 12/08 700/275 |
| 2017/0105448 A1* | 4/2017 | Scarpulla ............ A24F 47/002 |
| 2017/0340009 A1 | 11/2017 | Hon |
| 2018/0070632 A1 | 3/2018 | Sur et al. |
| 2018/0146710 A1 | 5/2018 | Bessant et al. |
| 2018/0199627 A1 | 7/2018 | Bowen et al. |

FOREIGN PATENT DOCUMENTS

| | | | |
|---|---|---|---|
| GB | 2533652 A * | 6/2016 | ......... A24F 47/008 |
| WO | WO-2016119144 A1 | 8/2016 | |
| WO | WO-2017/045897 A1 | 3/2017 | |

* cited by examiner

DEVICE AND METHOD FOR CHECKING FILL LEVEL OF A CARTRIDGE

CROSS-REFERENCE TO RELATED APPLICATIONS

This application is a continuation of U.S. application Ser. No. 15/946,998, filed on Apr. 6, 2018, which is a continuation of and claims priority to PCT/EP2018/057334 filed on Mar. 22, 2018, and further claims priority to EP 17165579.8 filed on Apr. 7, 2017, the contents of each of which are hereby incorporated by reference in their entirety.

BACKGROUND

Field

At least one example embodiment relates to a aerosol-generating system comprising a liquid storage portion and a control unit by which the fill level of the liquid storage portion is determined. At least one example embodiment relates to a corresponding method of determining a fill level of a liquid storage portion.

Description of Related Art

An aerosol-generating system (also called a "vapor-generating system") may comprise a liquid storage portion and a vaporizer comprising a wick and coil heater arrangement. The liquid aerosol-forming substrate is provided to the vaporizer via the wick by capillary forces. In such systems there is a risk that the coil heater is activated, although the liquid aerosol-forming substrate of the liquid storage portion is used up. As a result no aerosol or vapor may be formed.

SUMMARY

At least one example embodiment relates to an aerosol-generating system comprising a liquid storage portion configured to hold a liquid aerosol-forming substrate, a liquid pressure sensor within the liquid storage portion configured to sense a liquid pressure in the liquid storage portion, a control unit in communication with the liquid pressure sensor, and an atmospheric pressure sensor in communication with the control unit. The atmospheric pressure sensor is configured to sense an atmospheric pressure of the environment. The control unit is configured to receive pressure signals from the liquid pressure sensor and the atmospheric pressure sensor. The control unit is configured to determine a fill level of the liquid aerosol-forming substrate based on a comparison of the sensed liquid pressure and the sensed atmospheric pressure.

In at least one example embodiments liquid storage portion. The pressure regulator is configured to control a pressure of the liquid aerosol-forming substrate.

At least one example embodiment is related to a method for determining a fill level of a liquid storage portion of an aerosol forming system.

In at least one example embodiment, a method includes providing a liquid storage portion configured to hold a liquid aerosol-forming substrate, providing a liquid pressure sensor within the liquid storage portion, providing an atmospheric pressure sensor configured to sense an ambient atmospheric pressure, providing a control circuit in communication with the liquid pressure sensor and the atmospheric pressure sensor, sensing a pressure at the liquid pressure sensor to generate a first pressure signal, communicating the first pressure signal to the control unit, sensing the ambient atmospheric pressure at the atmospheric pressure sensor to generate a second pressure signal, communicating the second pressure signal to the control unit, and determining the fill level by comparing the first pressure signal and the second pressure signal.

In at least one example embodiment, the method may also include providing an orientation sensor configured to determine an orientation of the liquid storage portion, and triggering the evaluation of the fill level depending on the determined orientation of the aerosol-generating system.

BRIEF DESCRIPTION OF THE DRAWINGS

The aerosol-generating system will be further described, by way of example only, with reference to the accompanying drawings.

DETAILED DESCRIPTION

Figure 1:
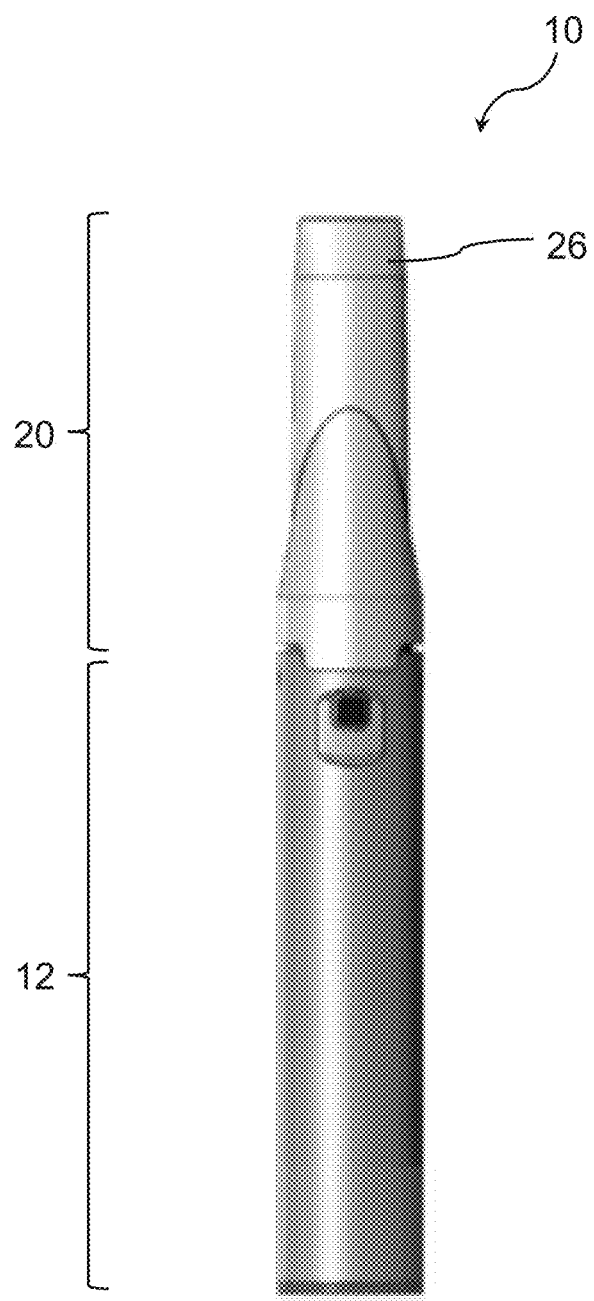
FIG. 1 shows a aerosol-generating system according to at least one example embodiment.

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

When the terms "about" or "substantially" are used in this specification in connection with a numerical value, it is intended that the associated numerical value include a tolerance of ±10% around the stated numerical value. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure.

At least one example embodiment relates to an aerosol-generating system (also called a "vapor-generating system") comprising a liquid storage portion configured to hold a liquid aerosol-forming substrate. The system further comprises a liquid pressure sensor provided within the liquid storage portion, and a control unit that is in communication with the liquid pressure sensor. The control unit is configured to determine the fill level of the liquid aerosol-forming substrate based on a pressure signal provided by the liquid pressure sensor. The aerosol-generating system may be an electronic vaping device, electronic cigarette, or any other electronic device that produces a vapor.

The aerosol-generating system allows a determination as to whether sufficient liquid aerosol-forming substrate is available in the liquid storage portion. The liquid pressure sensor senses the pressure excerpted by the liquid aerosol-forming substrate. The liquid pressure may be configured to be in direct contact with the liquid aerosol-forming substrate provided in the liquid storage portion. The liquid pressure sensor may be configured to be liquid-proof, such that the continued contact with the liquid aerosol-forming substrate does not negatively affect proper function of the liquid pressure sensor.

When the liquid pressure sensor is in contact with the liquid in the liquid storage portion, the total pressure measured by the liquid pressure sensor is, according to Pascals's law, the sum of the atmospheric pressure and the pressure caused by the liquid column above the liquid pressure sensor. In case the liquid pressure sensor in the liquid storage portion detects that no or not sufficient fluid is available, the control unit of the aerosol-generating system may prevent activation of the vaporizer until the liquid storage portion has been replaced or refilled. Upon detection of an empty liquid storage portion, the control unit may indicate via a display or similar device that a fresh liquid storage portion must be supplied or that refilling is required.

The liquid pressure sensor may be provided at a bottom of the liquid storage portion. By providing the liquid pressure sensor at the bottom of the liquid storage portion, the height of the liquid column that has an effect on the pressure measurement is increased and/or maximized. Moreover, in example embodiments in which the liquid storage portion is of an elongated cylindrical form, and the bottom of the liquid storage portion is defined by one of the end-faces of the cylindrical liquid storage portion, the liquid aerosol-forming substrate is in contact with the liquid pressure sensor over a rather wide range of orientations of the aerosol-generating system. Thus, in these orientations a reliable determination as to whether sufficient liquid aerosol-forming substrate is available may be performed.

As used herein, the term "bottom" is to be understood in the configuration as depicted in the accompanying figures. Thus, the bottom of the liquid storage portion denotes the lower portion of the liquid storage portion, when the aerosol-generating system is in the desired orientation for performing the fill level check as depicted in the accompanying figures.

As used herein, the term "liquid pressure sensor" refers to any pressure sensor that is suitable to determine the pressure excerpted by the liquid aerosol-forming substrate in the liquid storage portion.

The aerosol-generating system may further comprise a second pressure sensor in communication with the control unit. The second sensor may be configured to determine an atmospheric pressure of the environment. The second pressure sensor will therefore herein also be referred to as atmospheric pressure sensor. The control unit (or circuit) may be configured to receive the two pressure signals from the two pressure sensors comprised in the aerosol-generating system. The control unit is further configured to determine the fill level of the liquid aerosol-forming substrate based on a comparison of the two pressure signals.

When the liquid storage portion is filled with liquid aerosol-forming substrate and the liquid pressure sensor in the liquid storage is in contact with this liquid aerosol-forming substrate, the pressure that is measured by the liquid pressure sensor inside the liquid storage portion is higher than the ambient atmospheric pressure. Thus, a higher pressure reading inside the liquid storage portion as compared with the ambient atmospheric pressure is indicative of the presence of sufficient liquid aerosol-forming substrate in the liquid storage portion. In this configuration, the aerosol-generating system may be vaped.

As the liquid storage portion is progressively emptied by the continued vaping of the aerosol-generating system, the pressure value measured in the liquid storage portion continuously decreases until the pressure value becomes identical to the ambient atmospheric pressure. When the two pressure values are identical, the liquid storage portion is empty and needs refilling. In order to reduce and/or prevent completely emptying of the liquid storage portion, the control unit may be configured to alert an adult vaper once the difference between the pressure values has reached a certain desired (or, alternatively pre-determined) threshold value. This threshold may be determined to be about 10 percent above atmospheric pressure, about 5 percent above atmospheric pressure, or about 2 percent above atmospheric pressure.

Electronically operated aerosol-generating systems usually comprise a puff detection unit configured to detect a puff at the aerosol-generating system. In some example embodiments, the puff sensor is a pressure sensor that measures the pressure in an air flow path within the aerosol-generating system. A pressure drop in the air flow path within the aerosol-generating system is indicative of a puff and triggers activation of the vaporizing unit of the aerosol-generating system. When no puff is drawn, the pressure reading of such puff sensor corresponds to the ambient atmospheric pressure. Thus, in at least one example embodiment, the ambient atmospheric pressure may be determined by the pressure reading from the puff sensor in the puff detection unit of the aerosol-generating system. By using an already existing pressure sensor for determination of the ambient atmospheric pressure, additional functionality of the aerosol-generating system may be obtained without requiring additional components, and, thus, without increasing complexity of the system.

The pressure reading obtained with the liquid pressure sensor inside the liquid storage portion may depend on the orientation of the aerosol-generating system and the liquid storage portion, respectively. If the aerosol-generating system is a handheld system, it may well be possible that the aerosol-generating system is held upside down, such that the liquid pressure sensor is temporarily located at the top of the liquid storage portion. In this configuration the liquid pressure sensor may not be in contact with the liquid aerosol-forming substrate. If the control unit performs the fill level check in this configuration, it may be determined that the liquid storage portion is empty although in reality still sufficient liquid aerosol-forming substrate would still be available.

In order to avoid such erroneous fill level checks, the aerosol-generating system may comprise an orientation sensor that is in communication with the control unit. The orientation sensor may be configured to sense the orientation of the liquid storage portion. In at least one example embodiment in which the liquid storage portion is fixedly held within the aerosol-generating system, the orientation sensor may also be provided anywhere within the aerosol-generating system. In such example embodiments, the orientation of the aerosol-generating system may be used to determine the orientation of the liquid storage portion.

The control unit may therefore further be configured to initiate a fill level check only when the liquid storage portion is in the correct orientation. In this way an erroneous fill level check caused by misorientation of the liquid storage portion is reduced and/or avoided.

The orientation sensor may be any suitable commercially available orientation sensor. The orientation sensor may be a gyroscope sensor.

The liquid storage portion may be refillable. To this end the liquid storage portion may be provided with a refill opening. An adult vaper may refill liquid aerosol-forming substrate whenever the aerosol-generating system indicates that the liquid storage portion does not comprise sufficient liquid aerosol-forming substrate anymore.

The liquid storage portion may be configured as a replaceable liquid storage portion. The liquid sensor may form part of the replaceable liquid storage portion. Upon replacement of the liquid storage portion the contact between the liquid storage portion and the control unit requires only that corresponding electric connections are established between these components. However, as the liquid sensor is part of the liquid storage portion, the manufacturing cost for such liquid storage portions is increased.

The aerosol-generating system may comprise a device portion which in turn comprises the power source and electronic circuitry including the control unit. The device portion may also comprise the orientation sensor. The aerosol-generating system may further comprise a cartridge which comprises the liquid storage portion and optionally further comprises a vaporizer assembly and a mouthpiece. The cartridge may be releasably attached to the device portion of the aerosol-generating system.

The liquid pressure sensor may be part of the device portion. Upon assembly of the aerosol-generating system or upon replacement of the cartridge, the liquid pressure sensor will be located within the liquid storage portion of the cartridge such that the liquid pressure sensor is brought into direct contact with the liquid aerosol-forming substrate in the liquid storage portion. In at least one example embodiment, replacement of the cartridge therefore also requires not only electrical connections but also a fluid connection established between the device portion and the cartridge. However, as the cartridge does not comprise the liquid pressure sensor, resulting in no need of corresponding electric connections, the manufacturing cost of the individual cartridges is lower compared to cartridges comprising the liquid pressure sensor.

The liquid storage portion may also comprise pressurized liquid aerosol-forming substrate or may already be filled with pressurized aerosol. Such liquids under pressure might offer a more accurate pressure measurement to the system. In order to release the pressurized liquid or aerosol at a desired pressure for inhalation, a pressure regulator may be included in the aerosol-generating system.

At least one example embodiment relates to a method for determining the fill level of a liquid storage portion in an aerosol forming system. The method comprises the steps of providing a liquid storage portion holding liquid aerosol-forming substrate, providing a liquid pressure sensor within the liquid storage portion and providing a control unit that is in communication with the liquid pressure sensor. The liquid pressure sensor in the liquid storage portion senses a pressure value and communicates this pressure signal to the control unit. The control unit is configured to evaluate the pressure signal and to determine the fill level of the liquid aerosol-forming substrate in the liquid storage portion.

When evaluation of the pressure signal of the liquid pressure sensor results in the finding that the fill level in the liquid storage portion is sufficiently high, the aerosol-generating system may be operated by the adult vaper. When the control unit determines upon evaluation of the pressure signal that the liquid storage portion is empty or substantially empty, the adult vaper is notified accordingly and the aerosol-generating system cannot be activated before the liquid storage portion is refilled or replaced.

Fill level detection can generally be performed at any time during normal operation of the aerosol-generating system. It may be advantageous to perform fill level checks immediately before aerosol generation is started.

As the pressure reading of the liquid pressure sensor may depend on the correct orientation of the aerosol-generating system, the method may further comprise the steps of providing an orientation sensor configured to sense the orientation of the aerosol-generating system, and triggering the evaluation of the fill level depending on the determined orientation of the aerosol-generating system. Fill level detection is triggered only when the aerosol-generating system is in the correct orientation, in which the pressure sensor is located at the bottom of the liquid storage portion.

Features disclosed in combination with one aspect of the invention may readily be also used in combination with other aspects of the invention.

Figure 2:
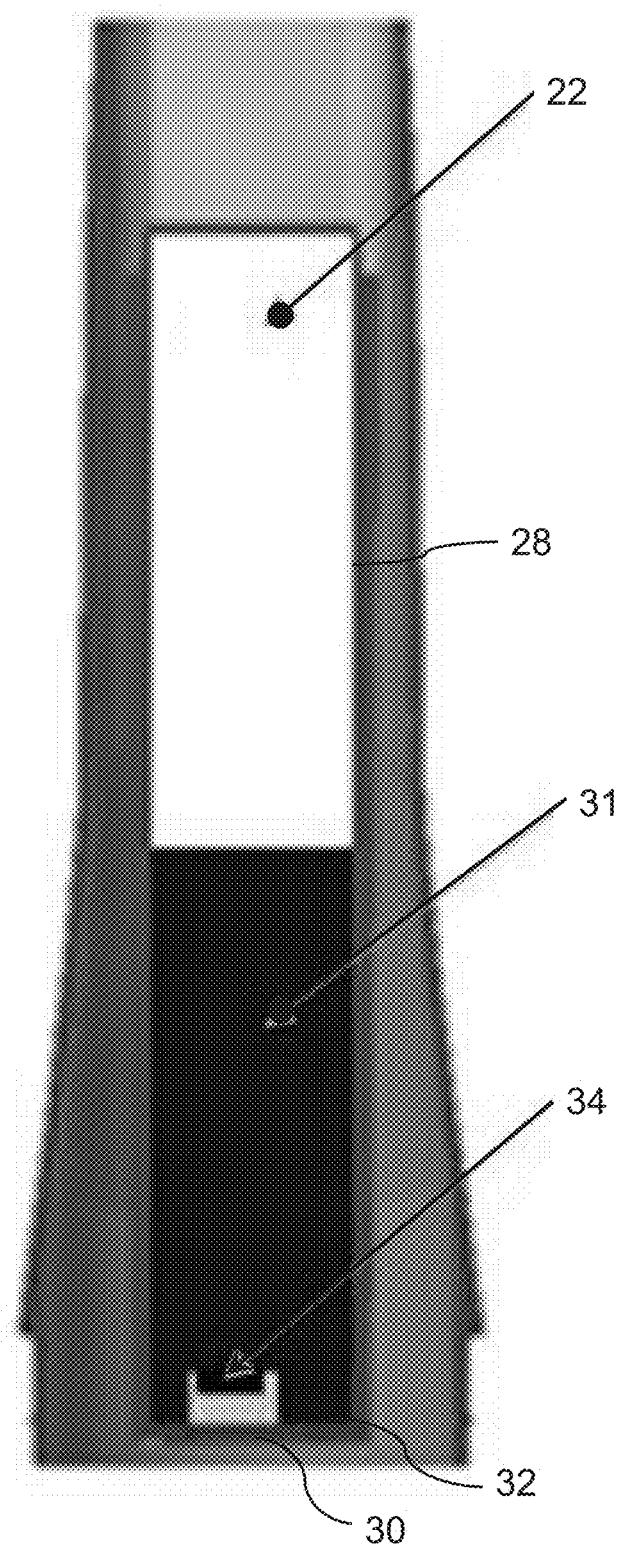
FIG. 2 shows a cross-section of the liquid storage portion of the aerosol-generating system of FIG. 1 according to at least one example embodiment.
Figure 3:
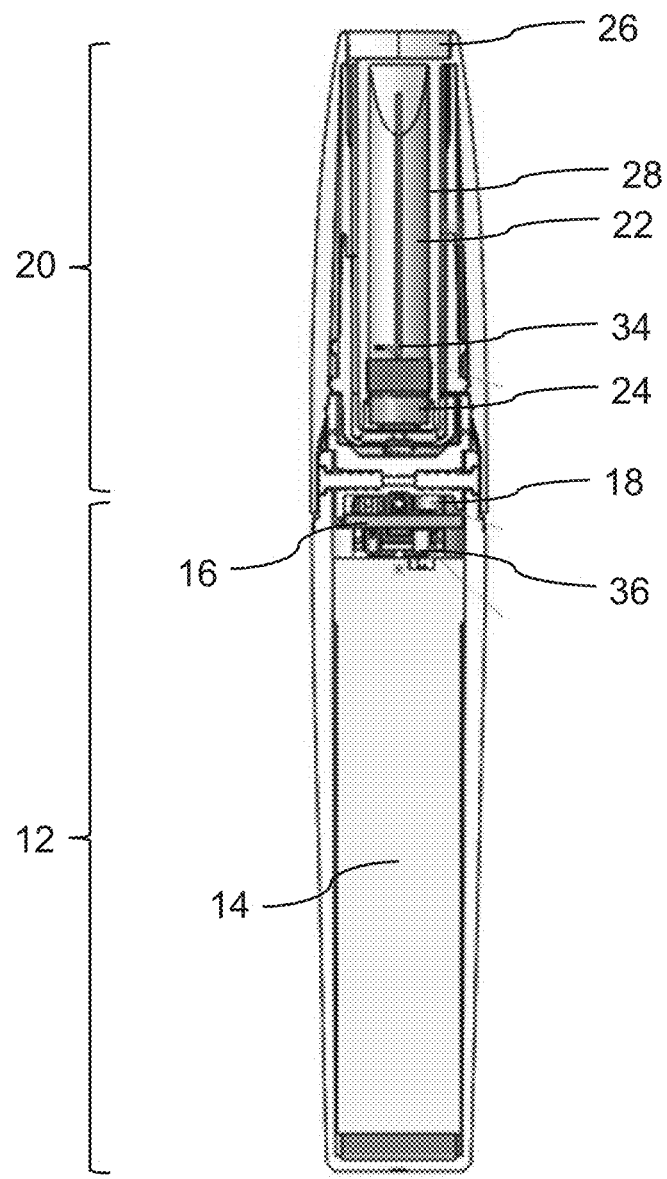
FIG. 3 shows a aerosol-generating system according to at least one example embodiment.

In FIGS. 1 to 3 an aerosol-generating system 10 is depicted that consists of a lower portion, the aerosol generating device 12, and an upper portion the aerosol generating article 20.

The aerosol-generating device 12 (also called a vapor-generating device) comprises a power source 14 and electric circuitry, including a control unit 16 and a puff detector 18. The aerosol-generating article 20 comprises a liquid storage portion 22, a vaporizer 24 and a mouth piece 26. Upon assembly of the aerosol-generating system 10 an electric connection is established between the aerosol-generating device 12 and the aerosol-generating article 20 such that the individual electric components of the aerosol-generating system 10 may communicate with each other.

The aerosol generating system 10 defines an air flow path from an air inlet, via the vaporizer 24 to the mouth piece 26.

FIG. 2 shows a cross-section through a portion of the aerosol-generating article 20 comprising the liquid storage portion 22. The liquid storage portion 22 comprises a housing 28 having an opening 30 through which the liquid aerosol-forming substrate 31 is delivered to the vaporizer. The fill level in the depicted liquid storage portion 22 is about 50 percent. In FIGS. 1 to 3 the aerosol-generating system 10 is in an upright position with the mouth piece 26 pointing upwards. In this configuration, at the bottom 32 of the liquid storage 22 portion there is provided a liquid pressure sensor 34. The liquid pressure sensor 34 may be liquid-proofed to be in contact with the aqueous liquid aerosol-forming substrate. When the liquid pressure sensor 34 is in contact with the liquid aerosol-forming substrate 31, the pressure measured by the liquid pressure sensor 34 is higher than the ambient atmospheric pressure. Further, the higher the liquid column above the liquid pressure sensor 34, the higher the measured pressure value. Thus, when the aerosol-generating article 20 is in the upright position as depicted in FIGS. 1 to 3, the pressure value is a measure for the liquid fill level in the liquid storage portion 22. The liquid pressure sensor 34 is in electrical connection with the control unit 16. The control unit 16 is configured to evaluate the pressure signal from the liquid pressure sensor 34. If this pressure signal indicates that the liquid storage portion 22 is empty or nearly empty, the control unit 16 prevents activation of the vaporizer 24.

FIG. 3 shows a detailed cross-section of an aerosol-generating system 10 according to at least one example embodiment. The general construction of this example embodiment is similar to the construction of the example embodiment depicted in FIG. 1. The upper portion, representing the aerosol-generating article 20 comprises a liquid storage portion 22. Again, at the bottom of the liquid storage portion 22 a liquid pressure sensor 34 is provided. The liquid pressure sensor 34 is again connected to the control unit 16.

The system depicted in FIG. 3 also comprises a puff sensor and further comprises a gyroscope sensor 36. Puff sensor 18 and gyroscope sensor 36 are both provided in the device portion 12 and are also both connected to the control unit 16. The puff sensor 18 is a pressure sensor which is primarily used for detecting the pressure within the air flow path defined in the aerosol generating system 10. A pressure drop at the puff sensor 18 is indicative of a puff drawn by an adult vaper, and as a response of the system, the vaporizer 24 is activated. When no puff is drawn at the aerosol-generating system 10, the pressure signal of the puff sensor 18 corresponds to the ambient atmospheric pressure. Thus, by comparing the pressure signals from the liquid pressure sensor 34 and the puff sensor 18, the fill level of the liquid aerosol-forming substrate may be determined. The larger the pressure difference between these two pressure signals, the more liquid aerosol-forming substrate is available in the liquid storage portion 22.

The gyroscope sensor 36 allows the control unit 16 to determine the orientation of the aerosol-generating system 10. The liquid storage portion is fixedly held with respect to the aerosol-generating system 10. Accordingly, the orientation of the liquid storage portion can be derived from the orientation of the aerosol-generating system 10.

As can be readily appreciated from the embodiment depicted in FIGS. 1 and 3 the determined pressure value also depends on the orientation of the liquid storage portion 22. A reliable pressure reading may be obtained, if the pressure is determined when the liquid storage portion 22 is in the correct upright orientation as depicted in FIGS. 1 to 3. To this end, the control unit 16 first ensures via the gyroscope sensor 36 the correct orientation of the liquid storage portion 22. When the control unit 16 has detected that the liquid storage portion 22 is in the correct orientation, the fill level determination may be triggered by the control unit 16.

The exemplary embodiments described above illustrate but are not limiting. In view of the above discussed exemplary embodiments, other embodiments consistent with the above exemplary embodiments will now be apparent to one of ordinary skill in the art.

We claim:

1. An aerosol-generating system comprising:
    a liquid storage portion configured to hold a liquid aerosol-forming substrate;
    a liquid pressure sensor within the liquid storage portion, the liquid pressure sensor configured to sense a liquid pressure in the liquid storage portion;
    a puff sensor configured to detect a puff and configured such that while no puff is detected, an ambient pressure is determined; and
    a control unit configured to determine a fill level of the liquid aerosol-forming substrate based on an output from the liquid pressure sensor and the puff sensor while a puff is not detected.

2. The aerosol-generating system of claim 1, wherein the liquid pressure sensor is at a bottom of the liquid storage portion.

3. The aerosol-generating system of claim 1, further comprising:
    an orientation sensor configured to sense an orientation of the liquid storage portion.

4. The aerosol-generating system of claim 3, wherein the control unit is configured to determine the fill level while the orientation sensor indicates that the aerosol-generating system is in a first orientation.

5. The aerosol-generating system of claim 3, wherein the orientation sensor is a gyroscope sensor.

6. The aerosol-generating system of claim 1, wherein the liquid storage portion is refillable.

7. The aerosol-generating system of claim 1, wherein the liquid storage portion is replaceable liquid storage portion, and
    wherein the liquid pressure sensor is part of liquid storage portion.

8. The aerosol-generating system of claim 1, wherein the aerosol-generating system includes an aerosol generating device, the liquid pressure sensor is part of the aerosol generating device, and the liquid pressure sensor is inserted at a bottom of the liquid storage portion when the liquid storage portion is attached to the aerosol generating device.

9. The aerosol-generating system of claim 1, wherein the liquid storage portion is pressurized and is filled with the liquid aerosol-forming substrate, a pressurized aerosol, or both the liquid aerosol-forming substrate and the pressurized aerosol.

10. The aerosol-generating system of claim 1, further comprising:
    a pressure regulator connected to an outlet of the liquid storage portion, the pressure regulator configured to control a pressure of the liquid aerosol-forming substrate.

11. A method for determining a fill level of a liquid storage portion in an aerosol forming system, comprising:
    sensing, with a liquid pressure sensor, a pressure at the liquid pressure sensor to generate a first pressure signal;
    sensing, with a puff sensor, an ambient pressure while the sensing of the ambient pressure indicates a pressure drop is non-existent so as to generate a second pressure signal; and
    determining the fill level based on first pressure signal and the second pressure signal.

12. The method of claim 11, further comprising:
    triggering an evaluation of the fill level depending on a determined orientation of the aerosol forming system by an orientation sensor.

13. The method of claim 12, further comprising:
    performing the evaluation, by a control unit, while the orientation sensor indicates that the aerosol forming system is in a first orientation.

14. The method of claim 12, wherein the orientation sensor is a gyroscope sensor.

15. The method of claim 11, wherein the liquid pressure sensor is at a bottom of the liquid storage portion.

16. The method of claim 11, further comprising:
    detecting a puff on the aerosol forming system in response to detecting the pressure drop.

17. The method of claim 11, wherein the liquid storage portion is refillable.

18. The method of claim 11, wherein:
    the liquid storage portion is a replaceable liquid storage portion, and
    the liquid pressure sensor is part of liquid storage portion.

19. The method of claim 11, further comprising:
    controlling, by a pressure regulator connected to an outlet of the liquid storage portion, a pressure of a liquid aerosol-forming substrate.

* * * * *